2,271,605

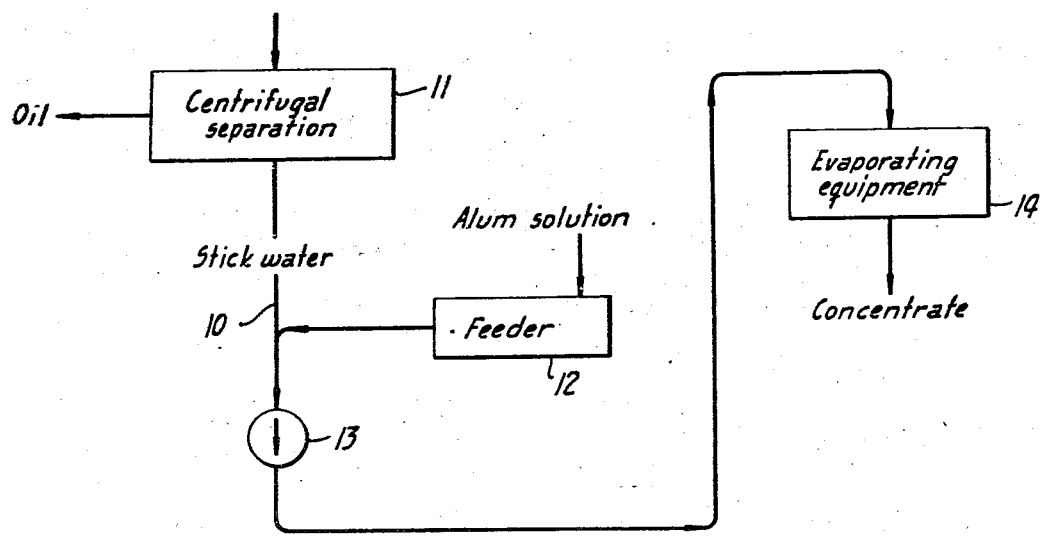
FIG_1_
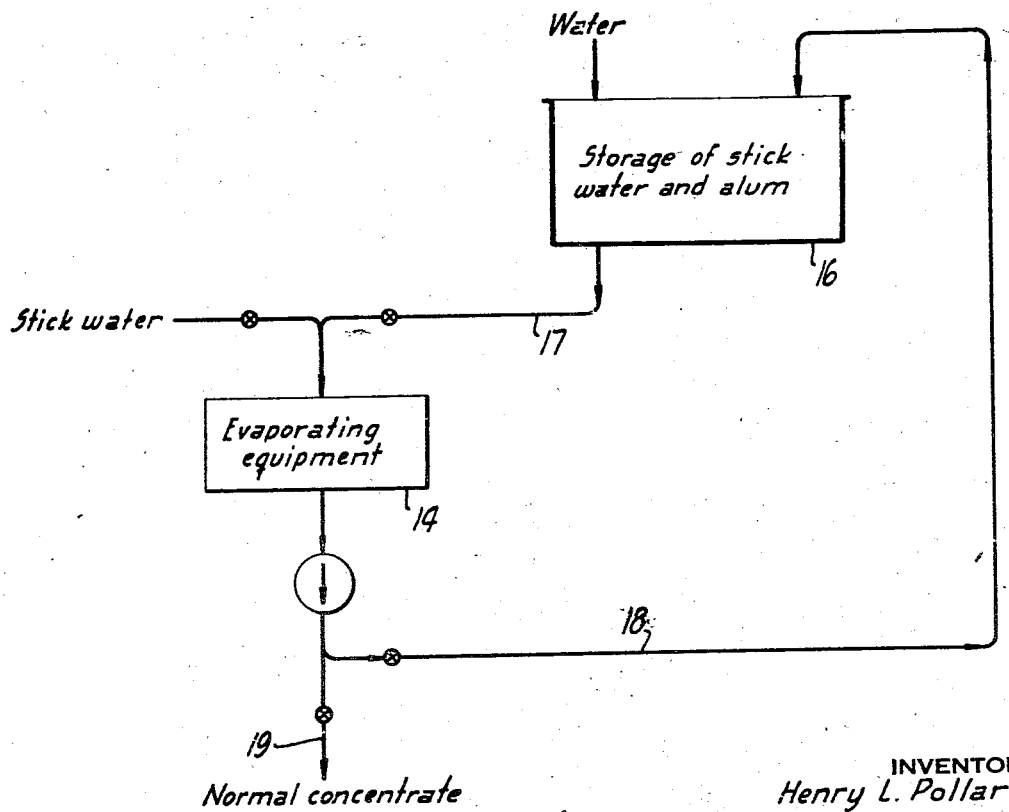
FIG_2_
INVENTOR
Henry L. Pollard
BY *Paul D. Flehr*
ATTORNEY Patented Feb. 3, 1942

UNITED STATES PATENT OFFICE 2,271,605

METHOD OF EVAPORATING FISH EXTRACT

Henry L. Pollard, Petaluma, Calif., assignor to Western Condensing Company, San Francisco, Calif., a corporation of California Application May 17, 1939, Serial No. 274,220

3 Claims. (Cl. 159—47)

This invention relates generally to processes for the evaporation of fish extract, particularly fish extract produced in connection with fish reduction plants.

In fish processing or fish reduction plants, making use of fish having a substantial oil content such as mackerel, sardines, herring, or menhaden, it is common to treat the fish in suitable steam cookers, after which they are subjected to mechanical pressure in a suitable press to express a large percentage of the liquid content. This liquid material is a mixture of oil and aqueous fractions, together with considerable water soluble solids, and some undissolved solids. Insofar as feasible the undissolved solids are removed by suitable processes such as settlement or filtration. The liquid material is then subjected to a series of separating operations which in most approved practices makes use of a battery of centrifuges, whereby valuable fish oil is removed from the aqueous fraction. The resulting aqueous fraction is commonly referred to as "stick water" and it consists largely of water, together with dissolved solids, a variable but usually small amount of suspended solids, and a very small quantity of remaining oil.

Stick water has presented a serious disposal problem to the fish industry, particularly when it is endeavored to convert the stick water into saleable by-products. One method of disposal is to concentrate the stick water by evaporation, after which it is converted to a dried material as by spray drying, or by intermixture with other solids of a fibrous nature. Concentration of stick water by evaporation has been found to be a difficult operation, due to the fact that a hard scale rapidly forms upon the heated surfaces of the evaporator with which the material is contacted. For example when using an evaporator of the type disclosed and claimed in Peebles and Manning Patent No. 2,090,985, scale formation upon the inner surfaces of the evaporating tubes rapidly decreases the capacity of the equipment. As a result in commercial operations where stick water is evaporated, the evaporators must be frequently shut down for the removal of accumulated scale, which is a difficult operation requiring use of wire brushes and/or strong acids. Also due to impaired capacity over a given operating period the size of the evaporating equipment must be relatively large for a given scale of operation.

It is an object of the present invention to provide a novel method for the concentration of stick water by evaporation, which makes it possible to control or practically eliminate scale formation as described above.

Further objects of the invention will appear from the following description in which the preferred embodiment of the invention has been set forth in detail.

Referring to the drawing:

Fig. 1 is a diagrammatic flow sheet illustrating one embodiment of the method.

Fig. 2 is another diagrammatic flow sheet illustrating a modification of the method.

My invention is predicated upon the discovery that a small amount of alum introduced into stick water, has a remarkable effect upon scale formation. For example I have found that when stick water is being concentrated in an evaporator of the type disclosed in the aforesaid Patent No. 2,090,985, and the efficiency and capacity of the equipment has been substantially impaired by scale formation, a small amount of alum introduced into the stick water being supplied to the evaporator, causes a rapid increase in capacity. I have found that this treatment prevents scale formation, which as previously explained, is the principal cause for decreased capacity and impaired operation. I have also found that small amounts of alum continually intermixed with stick water being evaporated, cause a substantial absence of scale formation on the evaporating tubes over long operating periods.

In practice I prefer to make use of common alum (aluminum sulphate), which is initially dissolved in water. This solution is added to and mixed with the stick water as it passes to the evaporator.

As shown in Fig. 1 of the drawing where the stick water is flowing continually through a pipe 10 from the centrifugal separating equipment 11, the alum solution can be introduced continually into the same pipe, under the control of a suitable proportional feeder 12, after which the mixture can be passed through a pump 13 which insures thorough intermixture, and then delivered to the evaporating equipment 14. It has been found that with stick water obtained from reduction of California sardines, about 0.25% (by weight) of alum $(Al_2(SO_4)_3 18H_2O)$ will give good results in inhibiting scale formation. Larger amounts of alum can be used if desired, although such practice is not recommended since the cost of the process is increased without particular benefit.

Another manner of practicing the invention with the general procedure of Fig. 1 is to introduce the alum intermittently, for the purpose of controlling scale formation. Thus after handling a certain amount of the material, such as is known to cause scale formation to a substantial degree, one may introduce a solution of alum prepared as described above, by way of feeder 12, for a period of time sufficient to reduce or practically eliminate accumulated scale.

Another embodiment of the invention shown in Fig. 2 is to keep a certain amount of stick water in a separate container 16, to which alum has been added, and which is available for use in removing scale. Thus in plant operations where stick water is being evaporated in equipment 14, the flow of material from the main source of supply is interrupted when it is desired to reduce or remove scale from the evaporator tubes, and the stick water with alum supplied to the evaporator through line 17. The concentrate from the evaporator is returned through line 18 to the separate container 16 and water added as indicated to take the place of water evaporated. This procedure avoids the presence of alum in the final product and reduces alum consumption to a minimum. During normal operation circulation through tank 16 is interrupted and the concentrate is removed as indicated by line 19.

Alum is an effective coagulant, which is non-toxic in small amounts, and which is capable of a coagulating action upon a part of the nitrogenous ingredients present in stick water.

It might be assumed from the foregoing that a solution of alum and plain water might of itself serve the purpose of removing scale formation. Actual tests indicate however that a solution of alum in water will not dissolve the scale, even though the solution is supplied to the evaporator under the same conditions of operation as employed for stick water concentration. Thus it is believed that there is some peculiar reaction or condition present in the stick water into which alum has been introduced, which I attribute to the presence of fish proteins, and which serves to inhibit and remove scale formation.

Since the present invention makes possible operation of evaporating equipment at maximum capacity, it will be apparent that for a given scale of plant operation, the evaporating equipment need not be of abnormal size. In addition, shut down of the equipment for the purpose of removing scale, can be eliminated or reduced to a minimum, to effect a substantial saving in maintenance and labor. All of these factors contribute to lower over-all cost in converting stick water into saleable by-products. Although alum appears in the final product the amount present can be sufficiently small as to have no detrimental biological effects.

I claim:

1. In a method for the concentration of stick water by evaporation, where the evaporation is effected by contact of the stick water with heated surfaces, the step of introducing alum into the stick water to inhibit or remove scale formation on the heated surfaces.

2. In a method for the concentration of stick water by evaporation, where the evaporation is effected by contact of the stick water with heated surfaces, the step of introducing alum into the stick water in amounts of the order of about 0.25% or more by weight, the alum serving to inhibit or remove scale formation on the heated surfaces.

3. In a method for the concentration of stick water by evaporation, where the evaporation is effected by contact of the stick water with heated surfaces, the step of contacting the heated surfaces with a liquid material containing fish proteins and alum whereby scale formation is inhibited or removed.

HENRY L. POLLARD.